United States Patent [19]

Frister et al.

[11] Patent Number: 5,027,663

[45] Date of Patent: Jul. 2, 1991

[54] MEASURING DEVICE FOR DETERMINING THE TORQUE OF A ROTATING MECHANICAL PART

[75] Inventors: Frank Frister, Schwieberdingen; Peter Pfeffer, Lauffen/Neckar, both of Fed. Rep. of Germany

[73] Assignee: Robert Bosch GmbH, Stuttgart, Fed. Rep. of Germany

[21] Appl. No.: 477,886

[22] PCT Filed: Oct. 26, 1988

[86] PCT No.: PCT/DE88/00658

§ 371 Date: Apr. 12, 1990

§ 102(e) Date: Apr. 12, 1990

[87] PCT Pub. No.: WO89/04457

PCT Pub. Date: May 18, 1989

[30] Foreign Application Priority Data

Nov. 6, 1987 [DE] Fed. Rep. of Germany ....... 3737696

[51] Int. Cl.$^5$ .............................................. G01L 3/10
[52] U.S. Cl. ................................................ 73/862.33
[58] Field of Search ........... 73/862.33, 862.34, 862.32, 73/862.36

[56] References Cited

U.S. PATENT DOCUMENTS

| | | | |
|---|---|---|---|
| 2,049,330 | 7/1936 | Smith, Jr. ........................ | 73/862.36 |
| 2,173,039 | 9/1939 | Muir .............................. | 73/862.33 X |
| 2,403,952 | 7/1946 | Ruge . | |
| 2,999,294 | 9/1961 | Magarshack et al. ....... | 73/862.33 X |
| 3,728,896 | 4/1973 | Sheldon et al. . | |
| 4,135,390 | 1/1979 | Templin . | |
| 4,356,732 | 11/1982 | Hachtel et al. ................. | 73/862.33 |
| 4,805,463 | 2/1989 | Kelledes et al. ............... | 73/862.33 |

FOREIGN PATENT DOCUMENTS

| | | |
|---|---|---|
| 2951148 | 7/1981 | Fed. Rep. of Germany . |
| 3500134 | 7/1985 | Fed. Rep. of Germany . |
| 0009639 | 1/1985 | Japan ................................. 73/862.33 |

*Primary Examiner*—Charles A. Ruehl
*Attorney, Agent, or Firm*—Michael J. Striker

[57] ABSTRACT

A measuring device for determining a torque of a rotating mechanical part includes a torsion element formed as a spoke wheel with at least one radially extending bending rod, a rigid part, and at least one spoke, and a measuring pickup having a measuring element connected with the rigid part, and another measuring element connected with the one spoke. Each of the measuring elements has a disc having a layer of an electroconductive non-magnetic material and a plurality of uniformly spaced regions of an electrically non-conductive material. The measuring device further includes at least one coil which changes impedance in accordance with a relative position of the measuring elements which relative position changes dependent on bending of the bending rod.

10 Claims, 3 Drawing Sheets

MEASURING DEVICE FOR DETERMINING THE TORQUE OF A ROTATING MECHANICAL PART

BACKGROUND OF THE INVENTION

The invention relates to a measuring device. A known measuring device has two bodies comprising electrically conducting, nonmagnetic work material and arranged coaxially relative to a shaft, both of which bodies are connected with the shaft for joint rotation herewith and are rotatable relative to one another. In addition, a coil is provided which is coaxial relative to the shaft and is arranged in the immediate vicinity of the two bodies with high-frequency alternating current flowing through this coil. These bodies comprise cut-out portions whose mutual overlapping surface changes as the angle of rotation occurring between the two bodies increases, wherein the relative rotation of the two bodies can be determined for the purpose of measuring the change in impedance of the coil which is caused by eddy currents induced in the bodies. A torque rod is arranged in the axial direction of the shaft in order to produce this relative rotation, so that the measuring device is relatively long (DE-PS 29 51 148).

SUMMARY OF THE INVENTION

The object of the invention is a measuring device that is relatively short and can be used under relatively cramped installation conditions, that accurately determines the driving or driven moment (torque), and has a relatively simple and compact construction.

The object of the invention is achieved by providing a device in which a torsion element comprises at least one radially extending bending rod, a first measurement element is connected with a rigid part of the torsion element, and a second measurement element is connected with a body movable as a function of bending of the rod. The bending rods can be protected from unacceptably high torques by stops, so that an overload protection is achieved.

The present invention both as to its construction so to its mode of operation, together with additional objects and advantages thereof, will be best understood from the following detailed description of the preferred embodiment with reference to the accompanying drawings.

DESCRIPTION OF THE PREFERRED EMBODIMENT

Figure 1:
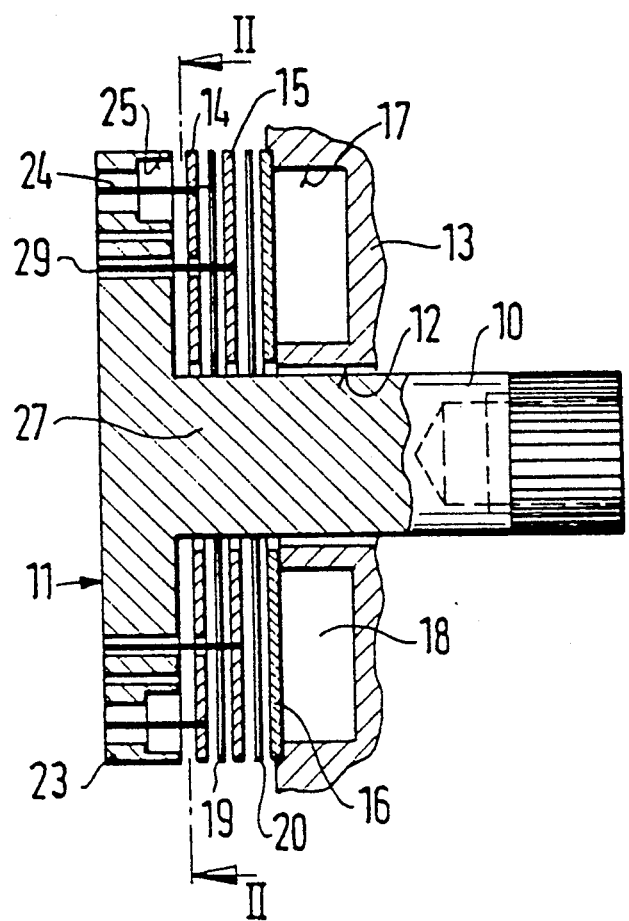
FIG. 1 shows a longitudinal cross-sectional view of a torque sensor according to the invention.
Figure 2:
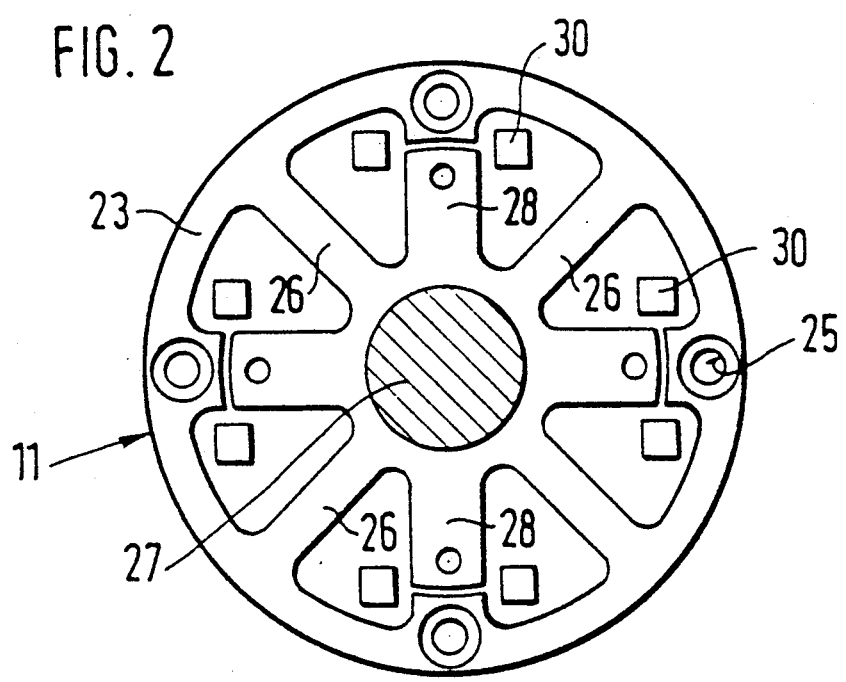
FIG. 2 shows a a view in direction II—II.

A shaft is designated by 10 in FIG. 1 and comprises a flange 11 at one end and projects through a bore hole 12 of a housing 13 at the other end. Two slotted disks 14, 15 are arranged between the flange 11 and the housing 13 so as to be concentric relative to the shaft 10. A flat coil 16 is fastened at the housing 13 so as to face the front sides of the slotted disks 14, 15. Another coil shape can also be considered instead of a flat coil 16, wherein, however, the flat coil 16 is particularly compact and economical with respect to space. In addition, a recess 17 which is open toward the slotted disks 14, 15 is formed in the housing 13, sensor electronics 18 for evaluating the measurement signals tapped at the flat coil 16 being arranged in the recess 17. The slotted disks 14, 15 are produced from electrically conducting, nonmagnetic material or are coated with a layer of this material. A sliding intermediate layer 19 and 20, respectively, is located between the two slotted disks 14, 15 and between the slotted disk 15 and the flat coil 16.

The flange 11 is constructed as a spoke wheel. It comprises an outer rim 23 which is rigidly connected with the slotted disk 14 via a connection part 24. In addition, a plurality of continuous bore holes 25, by means of which e.g. an electric motor, not shown, can be flanged on, are formed in the rim 23 so as to be spaced by approximately 90° relative to one another. Accordingly, a driving torque can be introduced on the rim 23. Only every first spoke 26 of the spoke wheel is securely connected with the hub 27 and the rim 23 and accordingly serves as a bending rod. The second spokes 28 are fixed on the hub 27, but are separated from the rim 23. These second spokes are rigidly connected with the slotted disk 15. For this purpose a connection part 29 is fastened in a bore hole at the end of the second spokes 28 facing the rim 23. However, the slotted disk 15 can also be connected directly with the shaft 10.

The second spokes 28 having the one free end are thicker than the first spokes 26, so that they have a high mechanical bending strength. Stops 30 are located in the area of the free ends of the second spokes 28 to the left and to the right of the ends as seen in the rotating direction. The stops 30 are arranged in such a way that an angle of rotation of the second spokes 28 of approximately 0.3° to 0.7° is possible.

Figure 3:
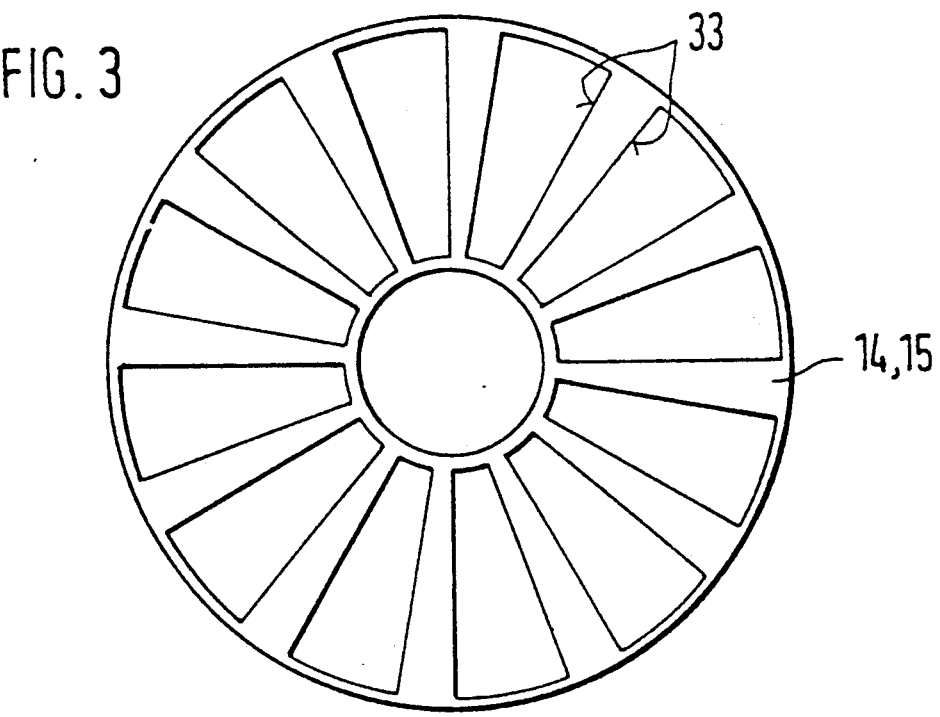
FIG. 3 shows a top view of a slotted disk of the torque sensor.

A top view of a slotted disk 14 and 15, respectively, is shown in FIG. 3. The slotted disk comprises a plurality of radial slots 33 which are arranged at the same angular distance from one another and have the same angular value.

Figure 3A:
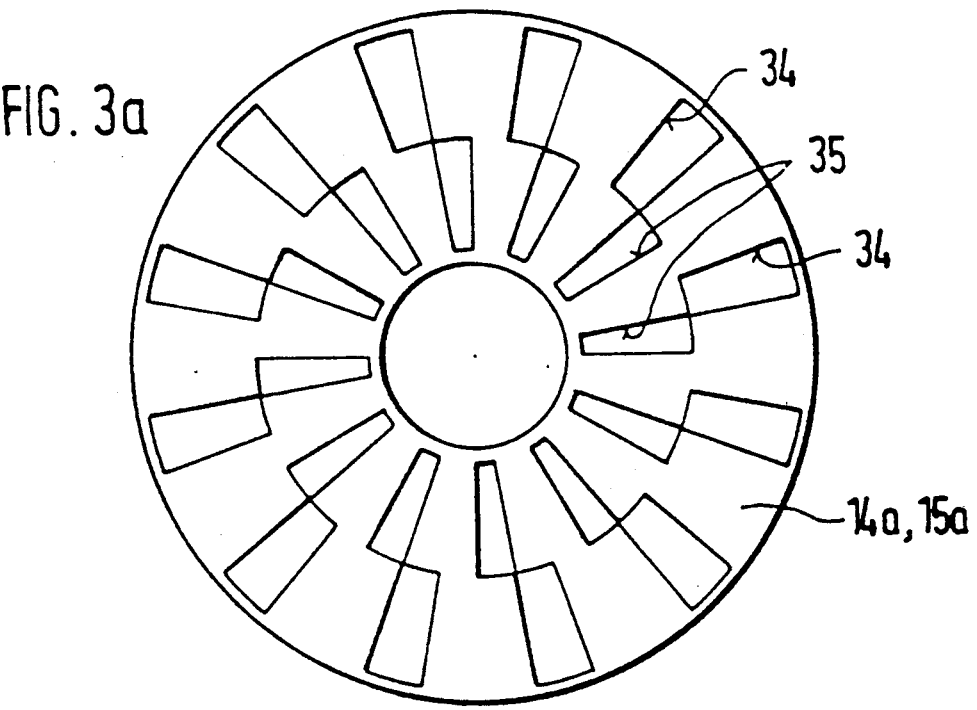
FIGS. 3a and 3b, respectively, show modifications of the slotted disk.
Figure 3B:
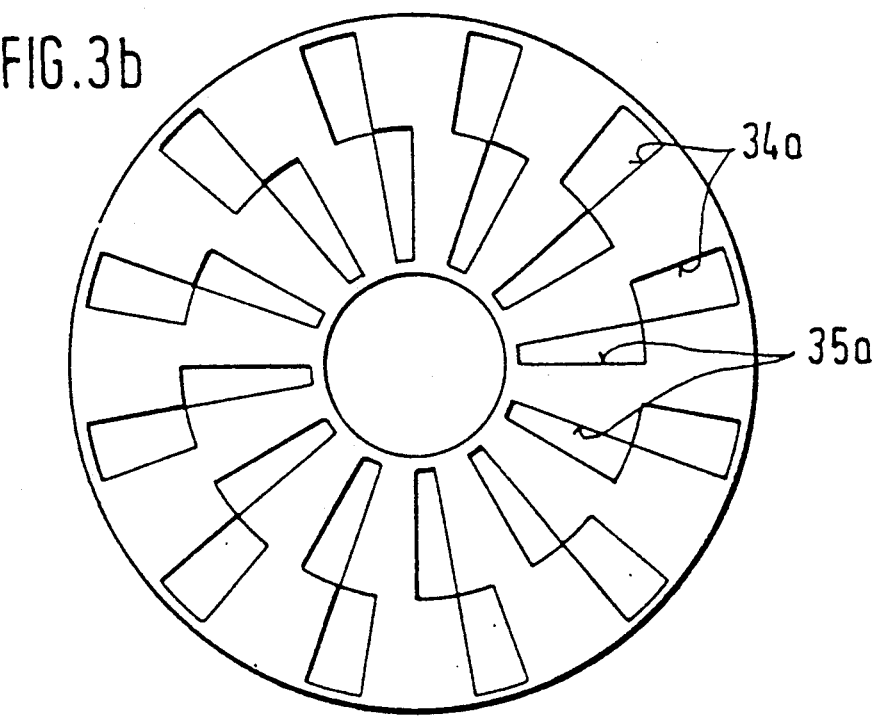

In the view of the slotted disk 14a and 15a, respectively, in FIG. 3a, the slots 34, 35 have only half the radial length, but the same angular value, compared with the construction in FIG. 3. In addition, the slots 34, 35 are offset relative to one another in such a way that the edges of the slots overlap one another to the maximum extent. In this construction of the slotted disk 14a and 15a, respectively, a coil is necessary for every slot row 34 and 35, respectively. These two coils are connected in series electrically, so that a differential connection of the two measurement signals is possible. One of the two slotted disks is to be constructed as shown in FIG. 3 and the other as shown in FIG. 3a. It is possible to determine by the offset construction of the slot rows 34 and 35 and the two coils whether or not the torque being measured acts to the left or to the right. In contrast to FIG. 3a, the slots 34a, 35a are constructed so as to be identical with respect to surface area in FIG. 3b.

Figure 4:
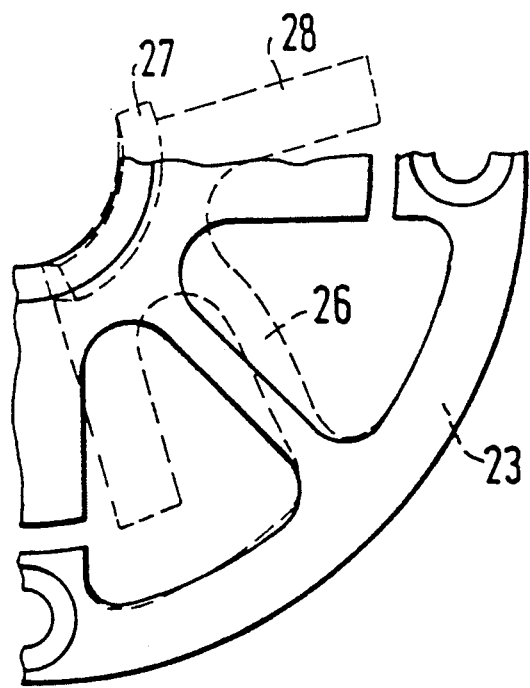
FIG. 4 shows a view of the torsion element in a basic position and in a torqued state.

If a torque M1, e.g. a driving torque, is transmitted to the flange 11, a torque M2, a so-called driven torque, can be tapped via the shaft 10, so that the first spokes 26 serving as bending rods are bent slightly. In FIG. 4, the spoke wheel 11 with spokes 26, 28 is shown in the basic position, i.e. with unbent first spokes 26, in solid lines. The spoke wheel with bent first spokes 26 is drawn in with dashed lines. It can be seen that the second spokes 28 are moved in proportion to the bending of the first spokes 26. Since the slotted disk 14 is rigidly connected with the rim 23 and the slotted disk 15 is rigidly connected with the second spokes 28, a rotation of the two slotted disks 14, 15 is effected at a determined angle. When a high-frequency alternating current flows through the coil 16, an eddy current is generated on the surface of the two slotted disks 14, 15. The development of eddy current is increased or decreased by the variable overlap ratio of the two slotted disks 14, 15. The impedance of the flat coil 16, which changes by means of this, is a function of the measured torque. The measurement signals obtained in this way are fed to the evaluating circuit 18, so that a connected mechanical part can be controlled or regulated. The stops 30 serve as overload protection for the first spokes 26 constructed as bending rods. As mentioned above, a corresponding angle of rotation of the second spokes 28 is achieved when a determined driving torque is introduced. However, if a determined torque is exceeded, the second spokes 28 come to rest at the stops 30. The additional torque is transmitted via the stops 30, so that the first spokes 26, the bending rods, are protected from unacceptably high torques. Accordingly, a so-called overload protection is possible, which prevents the first spokes 26 from breaking.

It is particularly advantageous to use a torque sensor in an electromotive auxiliary steering means for a vehicle. The shaft 10 then leads to the steering gear unit. The steering gear unit or a servomotor is fastened at the flange 11. In auxiliary steering means, a particularly compact construction is necessary, which is made possible by the radial construction of the bending rods.

While the invention has been illustrated and described as embodied in a measuring device for determining the torque of a rotating mechanical part, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A measuring device for determining a torque of a rotating mechanical part, said measuring device comprising a torsion element formed as a spoke wheel including at least one radially extending bending rod, a rigid part, and at least one spoke having a free end; a measuring pickup comprising a first measuring element connected with said rigid part, and a second measuring element connected with said at least one spoke, each of said first and second measuring elements comprising a disc having a layer of an electroconductive non-magnetic material and a plurality of uniformly spaced regions of an electrically non-conductive material; and at least one coil which changes impedance in accordance with a relative position of said first and second measuring elements which relative position changes dependent on bending of said bending rod.

2. A measuring device as set forth in claim 1, wherein said spoke wheel includes a plurality of radially extending bending rods and a plurality of spokes having a free end, said spokes being mechanically stronger than said bending rods.

3. A measuring device as set forth in claim 1, wherein said spoke wheel includes a plurality of spokes having a free end, and a plurality of stops arranged in regions of free ends of said spokes, respectively.

4. A measuring device for determining a torque of a rotatable shaft, said measuring device comprising a torsion element formed as a spoke wheel including at least one radially extending bending rod and a rigid part; a measuring pickup comprising a first measuring element connected with said rigid part, and a second measuring element connected with the rotatable shaft, each of said first and second measuring elements comprising a disc having a layer of an electroconductive non-magnetic material and a plurality of uniformly spaced regions of an electrically non-conductive material; and at least one coil which changes impedance in accordance with a relative position of said first and second measuring elements which relative position changes dependent on bending of said bending rod.

5. A measuring device as set forth in claim 4, wherein the rotatable shaft is connected to a steering gear of a motor vehicle.

6. A measuring device for determining a torque of a rotating mechanical part, said measuring device comprising a torsion element formed as a spoke wheel including at least one radially extending bending rod and a rigid part; a measuring pickup comprising a first measuring element connected with said rigid part, and a second measuring element associated with the mechanical part and rotatable therewith, each of said first and second measuring elements comprising a disc having a layer of an electroconductive non-magnetic material and a plurality of uniformly spaced electrically non-conductive regions; and at least one coil which changes impedance in accordance with a relative position of said first and second measuring elements which relative position changes dependent on bending of said bending rod.

7. A measuring device as set forth in claim 6, wherein said plurality of uniformly spaced regions comprises a plurality of radially extending slots having the same angular extent.

8. A measuring device as set forth in claim 6, wherein said plurality of uniformly spaced regions comprises a plurality of radially extending slots having the same angular extent and a length equal to a half of a predetermined radial length.

9. A measuring device as set forth in claim 8, wherein said plurality of radially extending slots comprises a plurality of pairs of slots, each pair of slots having a common radially extending surface, slots of each pair having the same radial extent and being radially and angularly offset with respect to their common radially extending plane.

10. A measuring device as set forth in claim 6, wherein a high frequency alternating current flow through said coil.

* * * * *